(12) United States Patent
Heard (10) Patent No.: US 6,424,526 B1
(45) Date of Patent: Jul. 23, 2002

(54) HIGH-DENSITY DISK-ARRAY PACKAGING APPARATUS AND METHOD

(75) Inventor: Christopher S. Heard, Brookline, NH (US)

(73) Assignee: Cereva Networks. Inc., Marlborough, MA (US)

( * ) Notice: Subject to any disclaimer, the term of this patent is extended or adjusted under 35 U.S.C. 154(b) by 0 days.

(21) Appl. No.: 09/882,168

(22) Filed: Jun. 15, 2001

(51) Int. Cl.[7] .................................................. G06F 1/16
(52) U.S. Cl. .................. 361/687; 174/35 R; 312/223.2; 435/7.1
(58) Field of Search ................................. 361/687, 688, 361/686, 695; 435/7.1; 174/35 R; 312/223.2, 223.3–223.6; 360/97.01

(56) References Cited

U.S. PATENT DOCUMENTS

| | | | | |
|---|---|---|---|---|
| 5,297,000 A | * | 3/1994 | Freige et al. | 361/692 |
| 5,813,740 A | * | 9/1998 | Chang | 312/223.2 |
| 6,018,125 A | * | 1/2000 | Collins et al. | 174/35 R |
| 6,247,944 B1 | * | 6/2001 | Bolognia et al. | 437/157 |

* cited by examiner

*Primary Examiner*—Darren Schuberg
*Assistant Examiner*—Hung Van Duong
(74) *Attorney, Agent, or Firm*—Kudirka & Jobse, LLP (57) ABSTRACT

A disk drive packaging apparatus has a chassis with open ends that encloses all of the disk drives. The open ends of the chassis are covered with conductive screens. A disk-drive carrier is provided for each drive that holds, but does not enclose, the disk drive. The screens provide both emission containment and guarantees adequate air distribution for cooling. Because the screens are able to contain the radiation emission, conductive enclosures are not needed for each separate drive, with the result that the drives can be packed more densely.

24 Claims, 7 Drawing Sheets

HIGH-DENSITY DISK-ARRAY PACKAGING APPARATUS AND METHOD

FIELD OF THE INVENTION

This invention concerns mechanical packaging techniques for arrays of computer disk drives in which the drives must be adequately cooled and at the same time provided with sufficient electromagnetic radiation shielding to meet prevailing emission standards.

BACKGROUND OF THE INVENTION

Large computer storage systems use multiple magnetic, optical, or magneto-optic disks to provide needed storage capacity. Frequently, these disk drives are used in combination to provide increased reliability though inter-disk coding techniques and through disk sparing. The disk drives are often packaged into arrays in order to decrease the amount of physical space needed to house them and in order to physically associate disks that are used combinations and as spares.

Regardless of the drive packaging arrangement, three problems have to be addressed: how to cool the drives, how to shield the drives to prevent the emission of excessive electromagnetic radiation and how to secure the drives in such a way as to minimize rotational vibration. Prior-art solutions to these problems typically entail housing each disk drive in its own metal, or combination metal and plastic, structure that allows air to flow around the drives and provides a conductive enclosure for emission control purposes. This conductive enclosure is then electrically connected to a common chassis ground using spring fingers or metal gaskets. However, the housing structure effectively increases the width of each disk drive and limits the density with which the drives can be packaged. For example, it is very difficult to fit more than thirteen conventional drives having a 3.5-inch, low-profile form factor into an Electronic Industry Alliance (EIA) standard 19-inch rack-mountable chassis using this technique.

Consequently, there is a need for packaging method and apparatus that enables a larger number of disk drives to be housed in the width available in a standard 19-inch rack than is possible with prior art methods and apparatus while still providing adequate cooling, radiation shielding and a mechanically secure method of mounting.

SUMMARY OF THE INVENTION

In accordance with the principles of the invention, disk drive packaging apparatus has a chassis with open ends that encloses all of the disk drives. The open ends of the chassis are covered with conductive screens. A disk-drive carrier is provided for each drive that holds, but does not enclose, the disk drive. The screens provide both emission containment and guarantees adequate air distribution for cooling. Because the screens are able to contain the radiation emission, conductive enclosures are not needed for each separate drive, with the result that the drives can be packed more densely.

In one embodiment, at least one conductive screen is mounted in a bezel assembly that is removably attached to one of the open chassis ends.

In another embodiment at least one, and preferably two fans are located in the chassis to draw air across the disk drives. The conductive screens insure uniform air distribution across all disk drives.

In still another embodiment, the disk drive carrier is fabricated entirely of a non-metallic material, such as a polymeric material, including carbon-reinforced nylon and glass-reinforced polycarbonate materials.

In yet another embodiment, the conductive screens have an open area that is approximately 52% of the total screen area that contains excess emissions.

BRIEF DESCRIPTION OF THE DRAWINGS

The above and further advantages of the invention may be better understood by referring to the following description in conjunction with the accompanying drawings in which.

DETAILED DESCRIPTION

Figure 1:
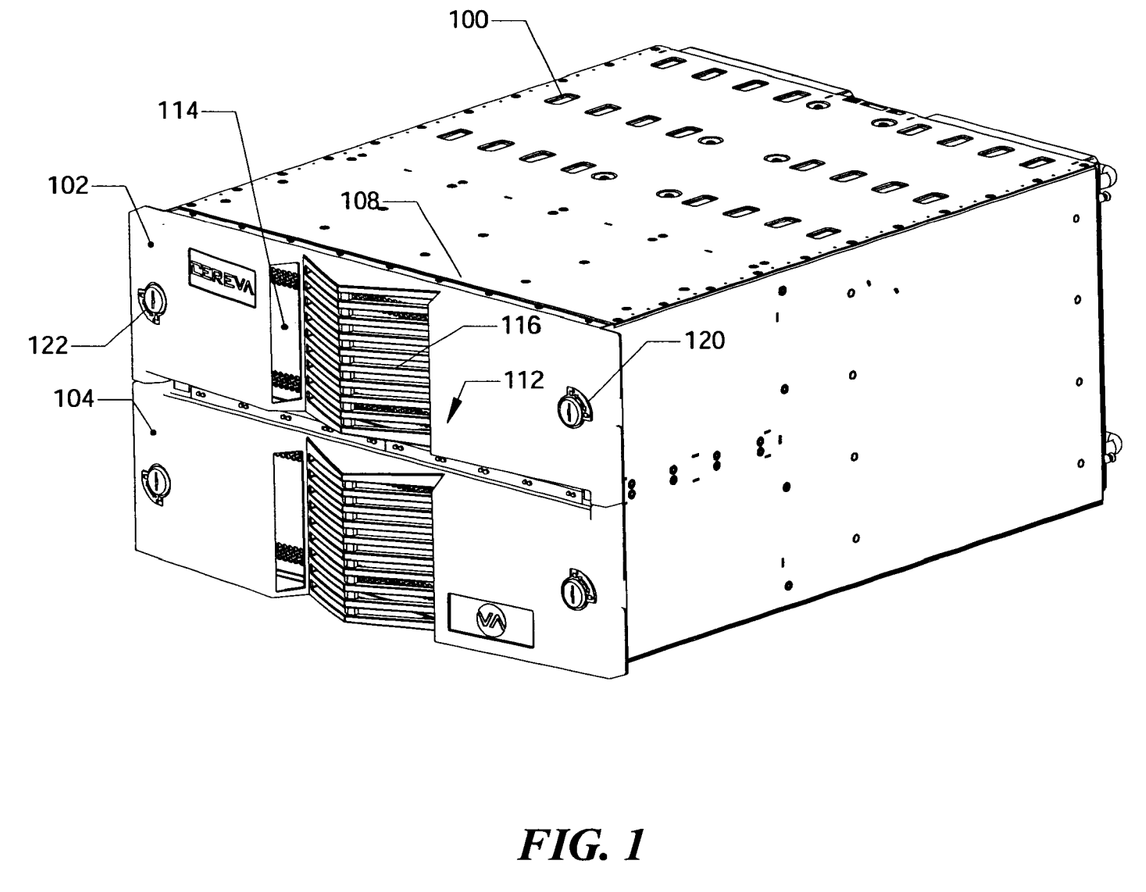
FIG. 1 is a perspective diagram of a high density disk-array package constructed in accordance with the principles of the invention.

A high density disk-array package 100 that is constructed in accordance with the principles of the invention are shown in FIG. 1. It would be obvious to those skilled in the art that the precise shape and dimension of the assembly as shown in the following figures can be varied without departing from the spirit and scope of the invention. Disk-array packages, such as package 100, can be stacked and can be mounted in an EIA-standard 19-inch rack.

Each package comprises a conductive chassis and two bezels. For example, package 100 comprises shroud 108 and bezels 102 and 104. Conductive chassis 108 comprises a conductive sheet metal box which has conductive top, bottom, and side panels and is open at the front to accommodate bezels 102 and 104 and at the back to accommodate power supplies (not shown in FIG. 1.) However, unlike prior art apparatus, the conductive chassis 108 surrounds all of the disks rather than individual disks.

Each bezel, such as bezel 102, comprises a grille area 112 which provides a vent for air intake and may include additional air passages such as slots 114 and 116. Bezels 102 and 104 may also include other ornamental or decorative molding that is not part of the functional design, but serves to enhance the aesthetics of the assembly. Not shown in FIG. 1 are internal screens in the bezels which provide radiation shielding.

Figure 2:
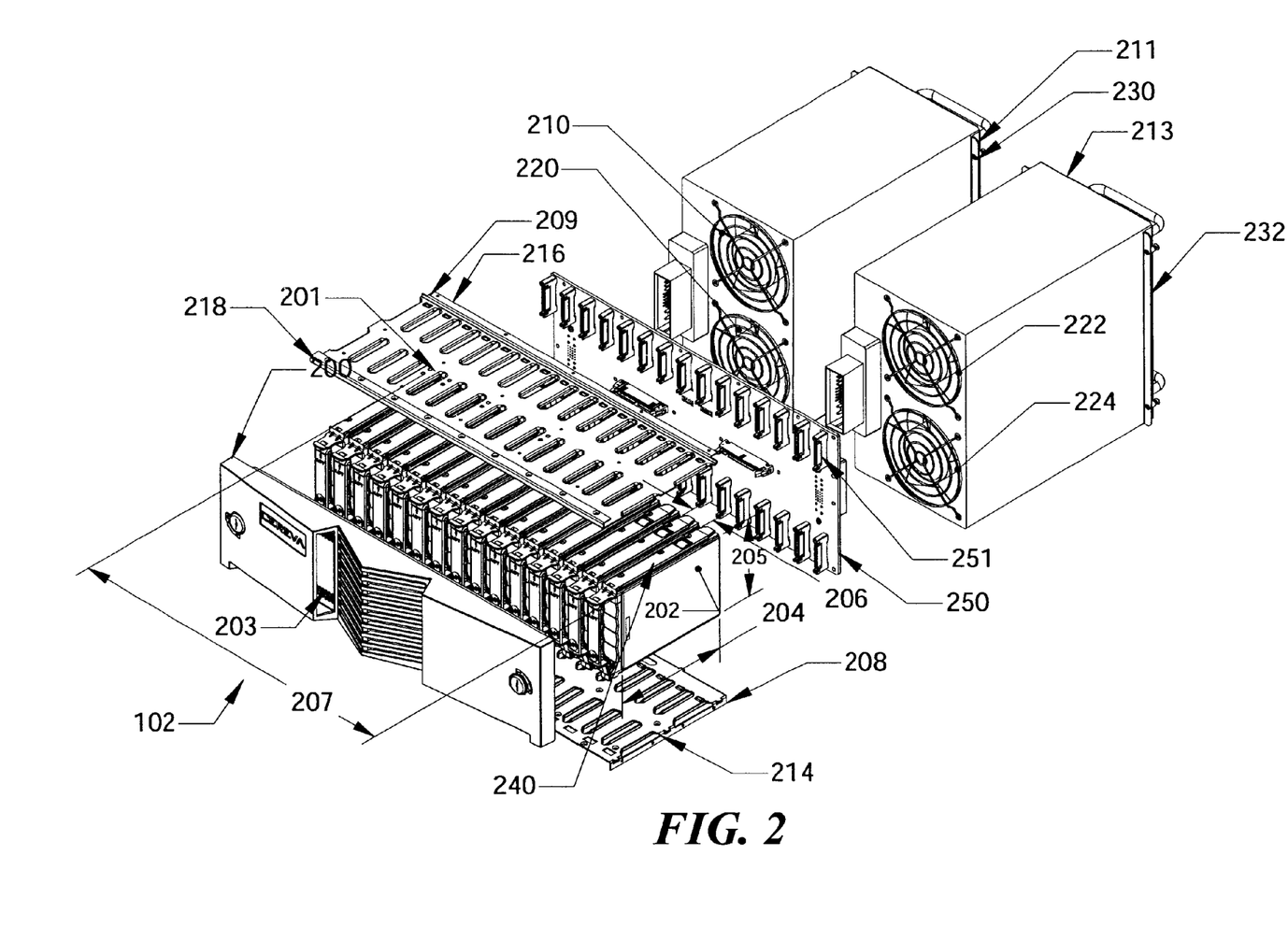
FIG. 2 is an exploded perspective diagram of selected internal components of the package shown in FIG. 1.

Selected internal components of a package, such as package 100, are shown in more detail in FIG. 2 where the chassis 108 has been removed to expose the interior of the package. FIG. 2 shows the upper bezel 102 and a single row of disks 202. Not shown are the lower bezel 104 and a second row of disks that would be located directly beneath those shown. In a preferred embodiment, the bezel 102 is comprised of faceplate 200 fabricated from a molded polymeric material attached to a metal screen 203. Because the faceplate 200 does not participate in the shielding aspects of the design, it can be molded in a variety of decorative shapes. Bezel 102 fits into upper portion of the front opening of the conductive chassis 108.

In a preferred embodiment, each package can house up to thirty 3.5-inch, low-profile disk drives 202 that are housed in two rows (of which one is shown) inside the chassis 108. Each disk 202 is held in a carrier 240 that is discussed below and the carrier 240 is, in turn, inserted into a card cage. Each card cage, in turn, comprises top and bottom card guides 208, 209 that are illustratively made of sheet metal that has been perforated at a plurality of points to form individual guides 201 for each disk carrier 240. The sheet metal card guides 208, 209 are illustratively attached, for example by rivets to the enclosing chassis 108. For example, card guide 208 can be attached to the side walls of chassis 108 by means of a flange 214 located at one end of the guide 208 and a similar flange located at the other end. Similarly, card guide 209 can be attached to the top panel of chassis 108 by means of flanges 216 and 218. Another pair of card guides (not shown in FIG. 2) can also be attached to the side wall and bottom of the chassis 108 to support the lower row of disk drives. At the rear of the card cage is a backplane 250. The backplane 250 is a printed circuit board that spans the two card guides 208 and 209 and provides power and ground connections, via connectors 251, for each disk drive.

Two power supplies 211 and 213, each with two fans 210, 220 and 222, and 224, slide into the rear of chassis 108 and plug into the backplane 250 in order to receive power. The fans 210, 220, 222 and 224 provide airflow over the disks.

In one illustrative embodiment, the dimensions of each disk-drive carrier 240 are 5.75 in. long (204) by 3.95 in. high (205) by 1.00 in. wide. The carriers 240 are spaced in the card cage at a 1.15-inch center-to-center separation (206). The card cages formed by guides 208 and 209 themselves are 17.30 inches wide (207) and can accommodate up to 15 disk drives each for a total of 30 disks per chassis. The opening of chassis 108 is 10.5 in. high and the internal backplane 250 is 7.2 inches high, allowing 1.65-inch gaps above and below it in the 10.5-inch-high chassis and thereby enabling adequate airflow around it.

Figure 3:
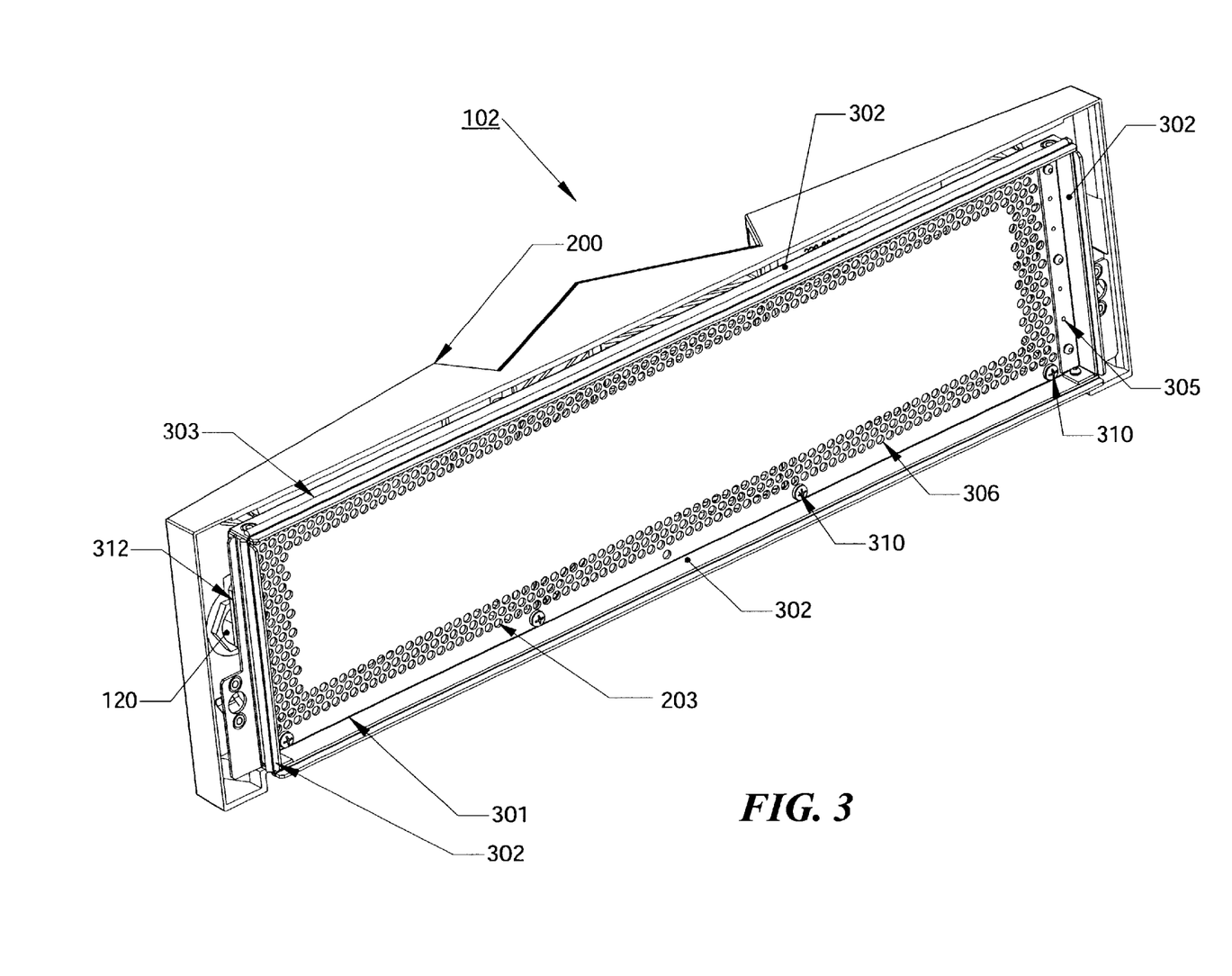
FIG. 3 is a perspective diagram of a front bezel assembly for the package shown in FIGS. 1 and 2 illustrating the emission screen.

The bezel assembly 102 is shown in greater detail in FIG. 3. A metal air vent assembly 301 is attached to the polymeric faceplate 200 by means of fasteners such as screws 310. The air vent assembly 301 consists of the conductive screen 203 surrounded by a conductive frame 305 with four conductive side panels 302 that slide into the front opening of chassis 108. A metal gasket 303 mounted on the side panels 302 ensures a tight fit between the side panels 302 and the chassis 108, thereby further containing radiation emissions.

The screen 203 is made of a thin conductive material, such as metal, having a plurality of holes 306 arranged in a circular pattern. The diameter of the holes is chosen to produce a screen 203 that has an open area that is about one half of the total area. In one illustrative embodiment, the open area of the holes is 52% of the total screen area and the holes 306 in the screen 203 have a 0.160in. diameter. With these dimensions, holes 306 in the screen are small enough to contain electromagnetic radiation emissions at frequencies as high as 12.5 GHz.

In addition, because the combined area of the holes 306 is only about one half of the total area of screen 203, screen 203 creates a pressure drop sufficient to control the distribution of air across the full span of the chassis 108. Fans 210, 220, 222 and 224 pull air in through the screen 203, across the drives 202 and exhaust the air out the back of the chassis 108. A screen (not shown), identical to screen 203 in the bezel assembly 102, is mounted to the rear surfaces 230, 232 of the power supplies 211 and 213 to contain emissions from the rear of the chassis 108. In one illustrative embodiment, each of fans 210, 220, 222 and 224 has a 150 cubic feet per minute (cfm) capacity. The pressure drop provided by screen 203 in the bezel assembly 102, combined with the 150-cfm capacity of each of the four fans 210, 220, 222 and 224 guarantees an adequate airflow across each of the disk drives 202 (and the drives in the row which is not shown in FIG. 2 even when one of fans 210, 220, 222 and 224 has failed.

Figure 4:
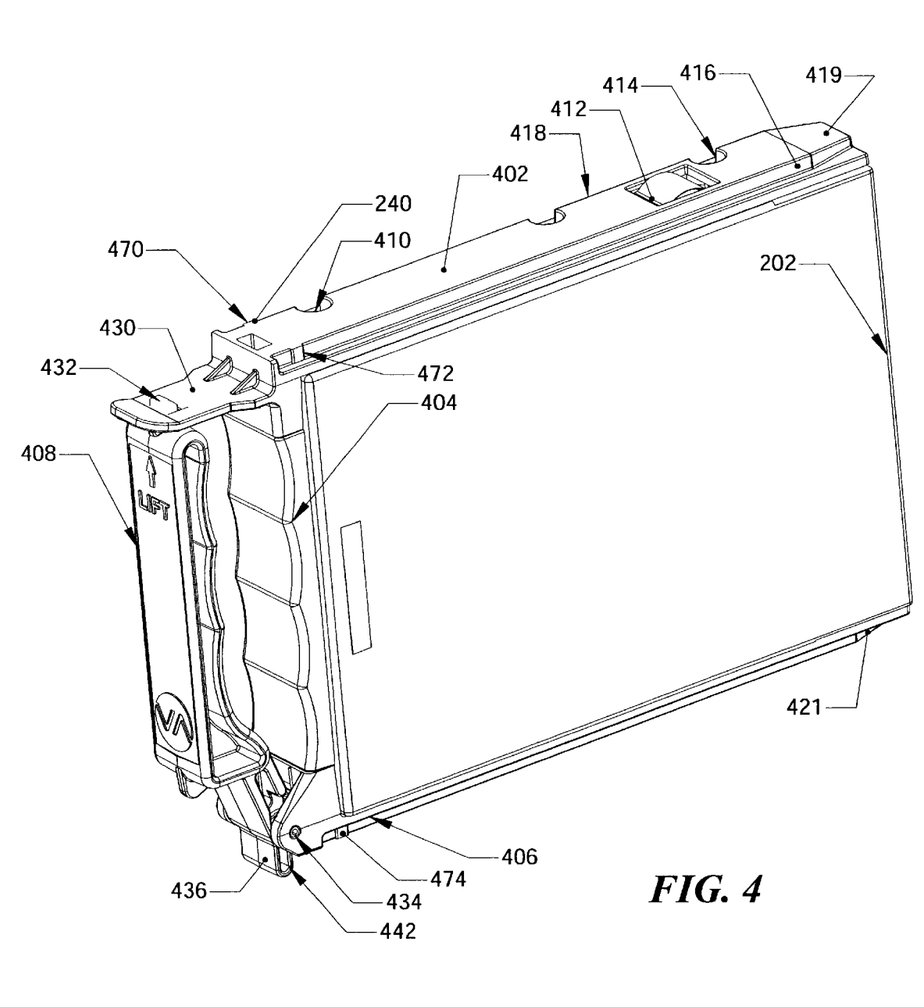
FIG. 4 is a perspective view of a disk carrier with a disk drive mounted therein.
Figure 5:
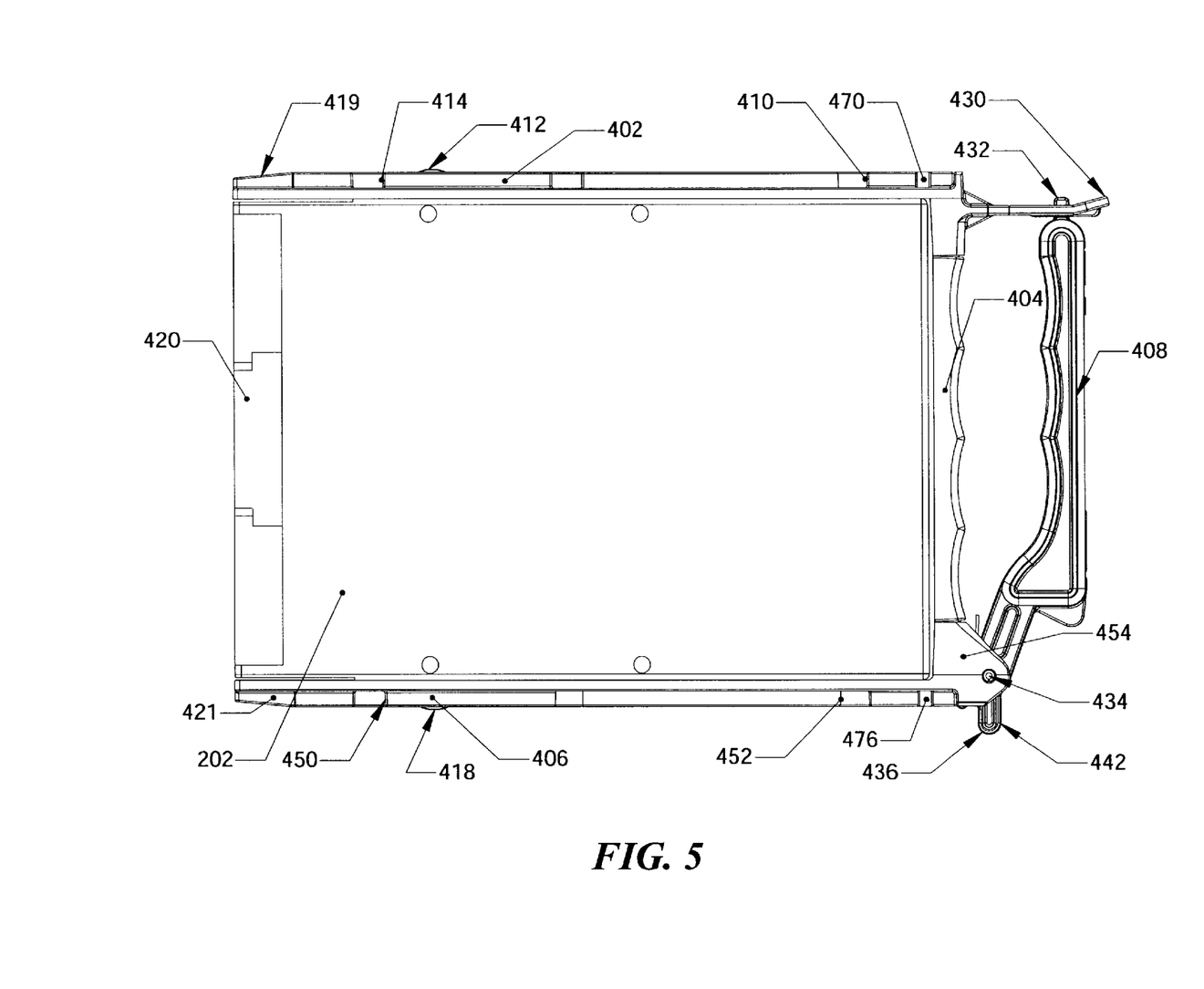
FIG. 5 is an elevation view of the disk carrier shown in FIG. 4.
Figure 6:
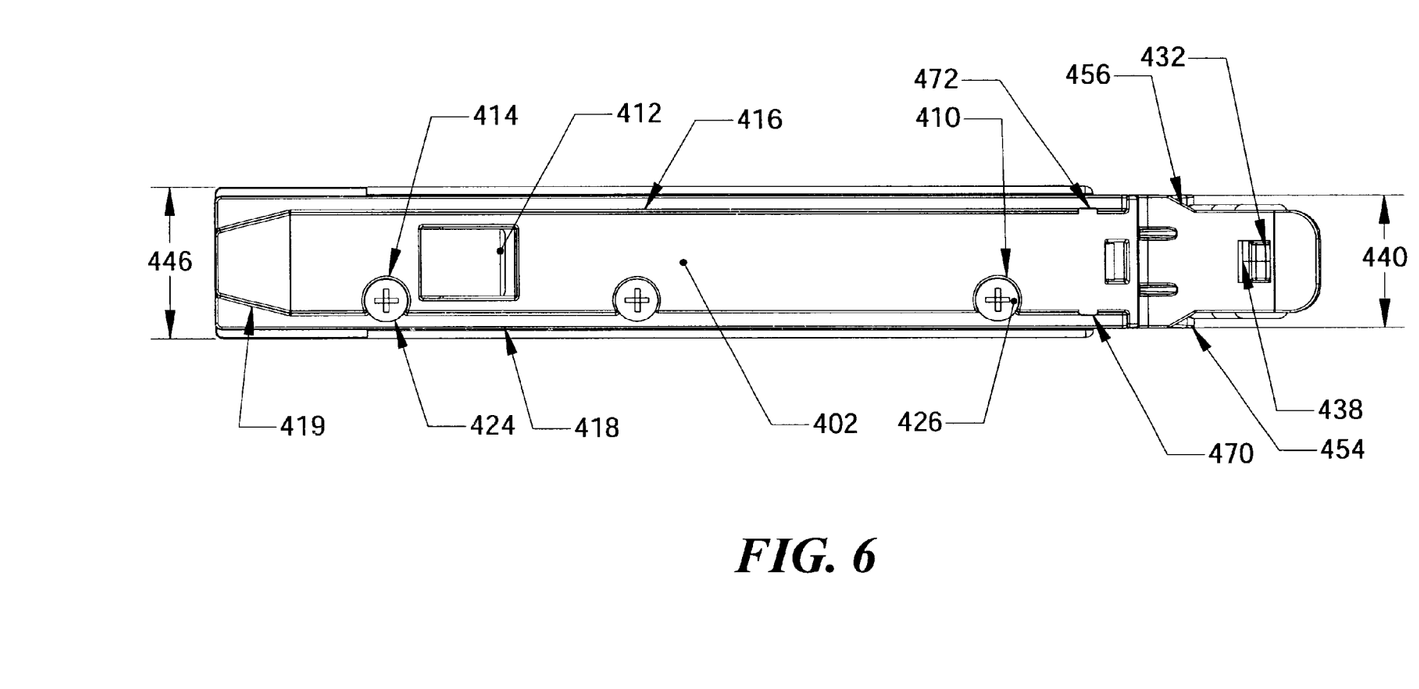
FIG. 6 is a top view of the disk carrier shown in FIG. 4.

A single disk-drive carrier 240 enclosing a disk drive 202 is illustrated in FIGS. 4, 5 and 6. The carrier 240 consists of four non-conductive components: a U-shaped carrier comprised of a top rail 402, a bottom rail 406 and a front component 404 that holds the rails 402 and 406 together and a handle 408. Illustratively, the top rail 402, the front component 404 and the bottom rail 406 can be formed from a single piece of material. In a preferred embodiment, the top rail 402, front component 404 and bottom rail 406 are molded from a polymeric material, such as carbon-reinforced nylon 6/6 as a single piece.

The disk drive 202 is mounted in the carrier 240 by means of screws 424 and 426 (FIG. 6) that pass through the top rail 402 and bottom rail 406 and seat against cutouts 414 and 410 in the top rail and 450 and 452 in the bottom rail 406. When the carrier 240 and disk 202 are inserted into the card cage, standard signal and power connectors 420 (FIG. 5) on the rear of the disk-drive 202 mate with their corresponding connectors 251 on the backplane 250 (FIG. 2).

The carrier rails 402 and 406 are slightly narrower than the disk drive 202. For example, in one embodiment, the carrier rails 402 and 406 may have a width 440 of 0.875 in. as compared to a 1.00 in. width 446 of the disk 202 itself. The carrier 240 is housed in the card cage with a 1.15 in. center-to-center spacing (206, FIG. 2), leaving sufficient room between them for air to flow for cooling purposes.

A handle 408 shown in greater detail in FIGS. 5 and 6 aids in inserting and removing the disk-drive carrier 240 from the card cage. Handle 408 is fabricated from a single piece of material. For example, it may be molded from a polymeric material, such as glass reinforced polycarbonate. The handle 408 is attached to the disk carrier 240 with a hinge pin 434 that passes through ears 454 and 456 on front component 404. The hinge pin 434 passes through a slot 442 in a finger 436 extending from the bottom of the handle 408. The slot allows the handle 408 to be slid up and down over the hinge pin 434.

The top rail 402 has a leaf spring 412 contact which makes electrical contact with the outer cover of disk drive 202 and protrudes slightly above the surface of the rail 402. In a similar manner, the bottom rail 406 has a similar contact 418. Contacts 416 and 418, in turn make electrical contact with the card guides 208 and 209 and ground the disk drive as it is being inserted into the assembly in order to avoid damage to the disk drive caused by electrostatic discharge.

Figure 7:
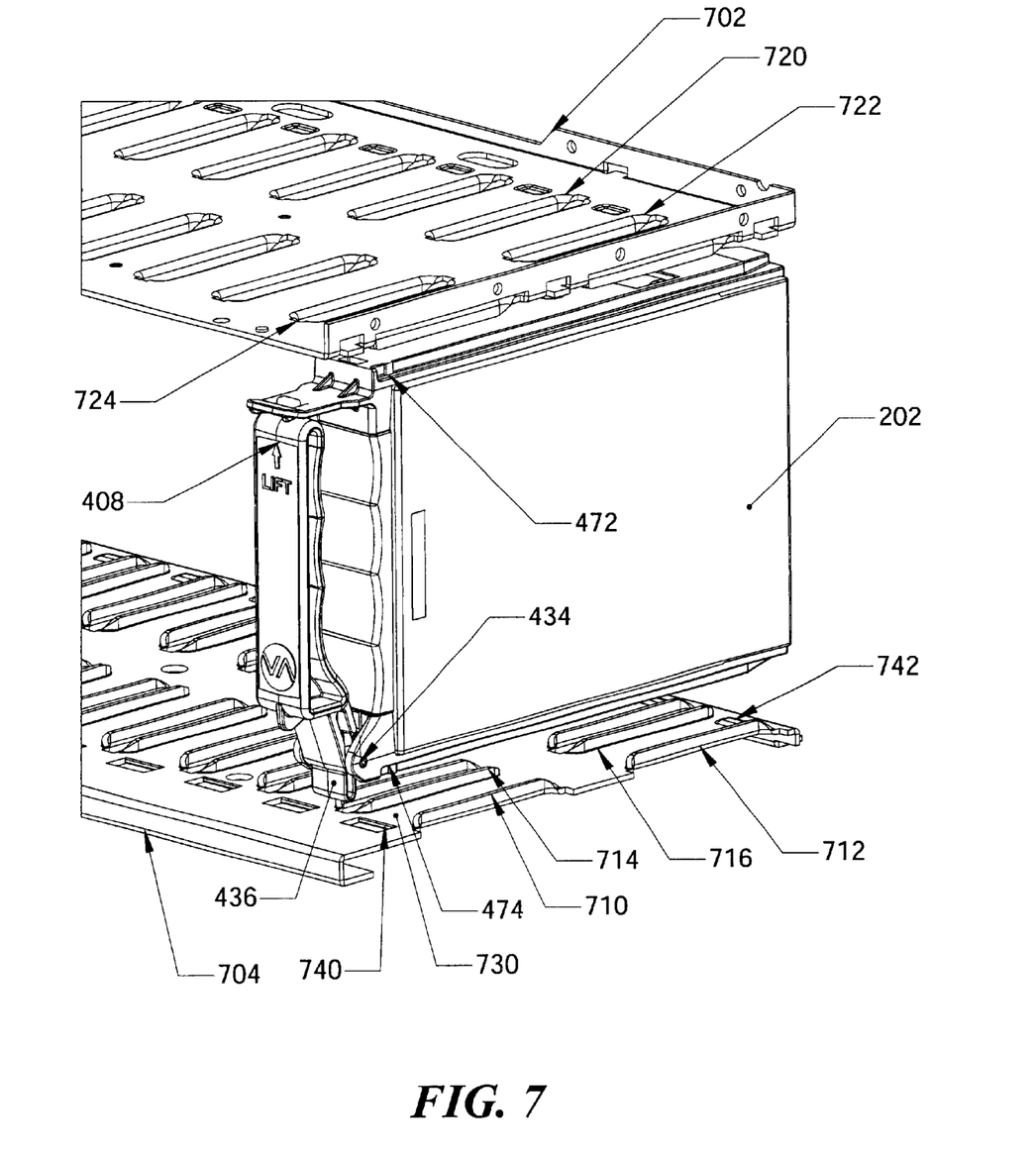
FIG. 7 is a perspective view illustrating how a disk carrier and disk are inserted and held in the card cage of the inventive disk array package.

FIG. 7 illustrates how the carrier 240 is inserted into the card cage and held there. FIG. 7 illustrates two card guides 702 and 704 which form the card cage for the bottom row of disk drives in the illustrative assembly. The top card guide 702 has two rows of stampings 720 and 724. Similarly, the bottom card guide 704 has two rows of stampings 714 and 716. Each stamping produces short vertical walls 710 that are bent at 90 degrees to the card guide body. The walls, in turn, form sets of carrier guide channels. For example, walls 710, 712, 714 and 716 form a guide channel 730. Similar channels are formed between the stampings on the top guide 702 and the bottom guide 704.

The disk carrier and its disk are inserted as follows. With the disk carrier 240 and drive 202 assembled and screwed together, the handle 408 is slid upwards over the hinge pin 434. The assembly is then slid into a guide channel such as channel 730 and the corresponding channel in top card guide 702 until resistance is felt as the contacts 420 at the back of the drive 202 engage the contacts on the backplane. The back ends 419 and 420 of top rail 402 and bottom rail 406 are tapered to aid in insertion.

Next, the handle 408 is rotated forward and slid down causing finger 436 at the bottom of the handle 408 to engage slot 740 in the card guide 704. With the finger 436 in the slot 740, the handle 408 is rotated backwards towards the carrier 240 and acts as a lever to provide the mechanical advantage required to overcome the resistance generated by contacts 420. When the handle 408 is moved towards the carrier 240, a small tab 432 at the top of the handle 408 slides under a flexible extension 430 at the top of the front component 404. As the tab 432 slides under the extension 430, it enters a hole 438 in the extension 430. The extension 430 thereupon snaps down over the tab 432 locking the carrier in position.

The top carrier rail 402 has two small protrusions 470 and 472, one on each side at the front of the rail 402. Likewise the bottom rail 406 has two protrusions 474 and 476. These protrusions are slightly wider than the width of the guide channel 730 formed by the stampings. In one embodiment, the protrusions are 0.034 in. wider than the width of the guide channel 730. The protrusions result in interference between the disk carrier and the card guides during the final 0.100" of drive insertion. This interference insures that the carrier fits tightly into the guide.

In addition, the guide channel 730 into which the disk carrier 240 is inserted has a small dimple 742 at the rear end. A similar dimple (not shown) is formed in the upper guide 702 at the rear of the corresponding guide channel. These dimples protrude a small distance, for example 0.025 inches, above the channel floor. As the carrier is inserted, these dimples that compress the top and bottom rails 402 and 406 against the disk drive 202 enough to capture the carrier and drive in the guide. The combination of protrusions 470, 472, 474 and 476 and dimples 742 secures the carrier 240 at all four corners, contributing to the eliminating of vibration that would otherwise be possible between the drive 202 and the chassis 108. The flexural modulus of elacticity of the material being greater than 2.5E6 PSI increases the natural frequency of the carrier sufficiently to eliminate resonance caused by the rotational forces of the drive.

The disk carrier and its disk are removed as follows. A user grips the handle 408 and slides the extension 430 upward with his thumb. When the extension is pushed sufficiently upwards, the tab 432 is released from the hole 438 allowing the handle to be rotated forward. The handle 408 again acts as a lever, this time to provide the mechanical advantage required to separate the contacts 420 from the backplane contacts. When the contacts 420 have been disengaged, the handle 408 can be slid upwards removing the finger 436 from the hole 740 thereby allowing the carrier 240 and drive 202 to be slid out of the card cage.

The inventive apparatus allows a very dense packaging of disk drives with only 0.150 inch of space between adjacent drives. Radiation emissions are contained by the metal screen 203 in the bezel assembly 200. Acceptable thermal performance is achieved through the combination of this same metal screen 203 with its highly resistive hole pattern and high-velocity fans 210, 220, 222 and 224. Vibration is minimized due to the interference between the plastic disk-drive carrier 240 and the metal card guides 720 and the very high strength of the material.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular construction that houses thirty disk drives, that other designs could be used in the same manner as that described. Other aspects, such as the specific parts utilized to achieve a particular function, as well as other modifications to the inventive concept are intended to be covered by the appended claims.

What is claimed is:

1. Apparatus for housing a plurality of disk drives, each having a width, in order to provide cooling and electromagnetic radiation emission control, the apparatus comprising:

a conductive chassis that encloses all of the disk drives and has open ends;

conductive screens disposed across the open chassis ends, the conductive screens having openings therein that are sufficiently small to prevent excessive radiation from passing therethrough;

a U-shaped non-conductive carrier for each disk drive, the carrier having a width less than the width of the disk drive; and card guides attached to the interior of the chassis that hold a plurality of disk carriers in order to mount the plurality of disks inside the chassis.

2. The apparatus of claim 1 further comprising a fan for drawing air through the chassis.

3. The apparatus of claim 1 wherein the conductive screens have about 50% open area.

4. The apparatus of claim 1 wherein each disk carrier is fabricated of a polymeric material.

5. The apparatus of claim 1 wherein at least one of the conductive screens is mounted in a non-conductive bezel.

6. The apparatus of claim 1 wherein each of the card guides comprises a metal plate having stampings therein that define guide channels for accommodating a disk drive carrier.

7. The apparatus of claim 2 wherein the fan is located inside the chassis.

8. The apparatus of claim 2 further comprising a second fan for drawing air through the chassis.

9. The apparatus of claim 5 wherein the conductive screens each have a 52% open area.

10. The apparatus of claim 5 wherein the bezel is removably attached to one of the chassis openings.

11. The apparatus of claim 6 wherein each disk drive carrier has at least one protrusion thereon which protrusion causes an interference fit in one of the guide channels to prevent vibration of the disk drive carrier in the chassis.

12. The apparatus of claim 6 wherein each disk drive carrier is fabricated of a polymeric material strong enough to increase the natural frequency of the carrier so that resonance caused by drive rotational acceleration is reduced.

13. A method for housing a plurality of disk drives, each having a width, in order to provide cooling and electromagnetic radiation emission control, the apparatus comprising:

(a) enclosing all of the disk drives in a conductive chassis that has open ends;

(b) placing conductive screens across the open chassis ends, the conductive screens having openings therein that are sufficiently small to prevent excessive radiation from passing therethrough;

(c) mounting each disk drive in a U-shaped non-conductive carrier, the carrier having a width less than the width of the disk drive; and (d) mounting a plurality of disk carriers in card guides attached to the interior of the chassis in order to mount the plurality of disks inside the chassis.

14. The method of claim 13 further comprising:

(e) using a fan to draw air through the chassis.

15. The method of claim 13 wherein the conductive screens have about 50% open area.

16. The method of claim 13 wherein each disk carrier is fabricated of a polymeric material.

17. The method of claim 13 further comprising:

(h) mounting at least one of the conductive screens in a non-conductive bezel.

18. The method of claim 13 wherein each of the card guides comprises a metal plate having stampings therein that define guide channels for accommodating a disk drive carrier.

19. The method of claim 14 wherein the fan is located inside the chassis.

20. The method of claim 14 further comprising:

(g) using a second fan to draw air through the chassis.

21. The method of claim 15 wherein the conductive screens have a 52% open area.

22. The method of claim 17 wherein step (h) comprises removably attaching the bezel to one of the chassis openings.

23. The method of claim 18 wherein each disk drive carrier has at least one protrusion thereon which protrusion causes an interference fit in one of the guide channels to prevent vibration of the disk drive carrier in the chassis.

24. The method of claim 18 wherein each disk drive carrier is fabricated of a polymeric material strong enough to increase the natural frequency of the carrier so that resonance caused by drive rotational acceleration is reduced.

* * * * *